(12) United States Patent
Chatterjee et al.

(10) Patent No.: US 8,046,548 B1
(45) Date of Patent: Oct. 25, 2011

(54) MAINTAINING DATA CONSISTENCY IN MIRRORED CLUSTER STORAGE SYSTEMS USING BITMAP WRITE-INTENT LOGGING

(75) Inventors: Paresh Chatterjee, Fremont, CA (US); Ajit Narayanan, Fremont, CA (US); Narayanan Balakrishnan, Milpitas, CA (US); Raja Jayaraman, Fremont, CA (US)

(73) Assignee: American Megatrends, Inc., Norcross, GA (US)

( * ) Notice: Subject to any disclaimer, the term of this patent is extended or adjusted under 35 U.S.C. 154(b) by 741 days.

(21) Appl. No.: 12/013,110

(22) Filed: Jan. 11, 2008

Related U.S. Application Data

(60) Provisional application No. 60/898,432, filed on Jan. 30, 2007.

(51) Int. Cl.
*G06F 13/00* (2006.01)
*G06F 13/28* (2006.01)
*G06F 7/00* (2006.01)
*G06F 17/00* (2006.01)

(52) U.S. Cl. ............... 711/162; 711/135; 711/E12.103; 707/655

(58) Field of Classification Search .................. 711/162, 711/135, E12.103; 707/655
See application file for complete search history.

(56) References Cited

U.S. PATENT DOCUMENTS

| | | | |
|---|---|---|---|
| 4,849,978 A | 7/1989 | Dishon et al. |
| 4,942,579 A | 7/1990 | Goodlander et al. |
| 5,257,367 A | 10/1993 | Gooddlander et al. |
| 5,524,204 A | 6/1996 | Verdoorn, Jr. |
| 5,604,862 A | 2/1997 | Midgely et al. |
| 5,678,061 A | 10/1997 | Mourad |
| 5,720,027 A | 2/1998 | Sarkozy et al. |
| 5,732,238 A | 3/1998 | Sarkozy |
| 5,787,459 A | 7/1998 | Stallmo et al. |
| 5,790,774 A | 8/1998 | Sarkozy |
| 5,893,919 A | 4/1999 | Sarkozy et al. |
| 5,907,849 A | 5/1999 | Dias et al. |
| 6,098,128 A | 8/2000 | Velez-McCaskey et al. |
| 6,105,122 A | 8/2000 | Muller et al. |
| 6,108,748 A | 8/2000 | Ofek et al. |
| 6,128,654 A | 10/2000 | Runaldue et al. |

(Continued)

OTHER PUBLICATIONS

U.S. Appl. No. 12/492,509, filed Jun. 26, 2009 entitled "Achieving Data Consistency in a Node Failover with a Degraded RAID Array", Inventors: Chatterjee et al.

(Continued)

*Primary Examiner* — Edward J Dudek, Jr.
(74) *Attorney, Agent, or Firm* — McKeon, Meunier, Carlin & Curfman, LLC

(57) ABSTRACT

Techniques for maintaining mirrored storage cluster data consistency can employ write-intent logging. The techniques can be scaled to any number of mirror nodes. The techniques can keep track of any outstanding I/Os, data in caches, and data that has gone out of sync between mirrored nodes due to link failures. The techniques can ensure that a power failure on any of the storage nodes does not result in inconsistent data among the storage nodes. The techniques may keep track of outstanding I/Os using a minimal memory foot-print and having a negligible impact on the I/O performance. Properly choosing the granularity of the system for tracking outstanding I/Os can result in a minimal amount of data requiring transfer to synchronize the mirror nodes. The capability to vary the granularity based on physical and logical parameters of the storage volumes may provide performance benefits.

4 Claims, 9 Drawing Sheets

U.S. PATENT DOCUMENTS

| | | | |
|---|---|---|---|
| 6,173,377 B1 * | 1/2001 | Yanai et al. | 711/162 |
| 6,282,619 B1 | 8/2001 | Islam et al. | |
| 6,289,398 B1 | 9/2001 | Stallmo et al. | |
| 6,434,681 B1 | 8/2002 | Armangau | |
| 6,487,561 B1 | 11/2002 | Ofek et al. | |
| 6,502,166 B1 | 12/2002 | Cassidy | |
| 6,671,705 B1 * | 12/2003 | Duprey et al. | 1/1 |
| 6,671,757 B1 | 12/2003 | Cash et al. | |
| 6,694,336 B1 | 2/2004 | Multer et al. | |
| 6,826,711 B2 | 11/2004 | Moulton et al. | |
| 6,915,448 B2 | 7/2005 | Murphy et al. | |
| 7,069,385 B2 | 6/2006 | Fujimoto et al. | |
| 7,089,448 B2 | 8/2006 | Hinshaw et al. | |
| 7,155,466 B2 | 12/2006 | Rodriguez et al. | |
| 7,159,150 B2 | 1/2007 | Kenchammana-Hosekote et al. | |
| 7,231,493 B2 | 6/2007 | Nguyen et al. | |
| 7,315,958 B1 | 1/2008 | Bridge, Jr. | |
| 7,415,486 B2 | 8/2008 | Multer | |
| 7,457,980 B2 | 11/2008 | Yang et al. | |
| 7,536,586 B2 | 5/2009 | Ahmadian et al. | |
| 2002/0059540 A1 | 5/2002 | Mann et al. | |
| 2003/0041283 A1 | 2/2003 | Murphy et al. | |
| 2003/0088803 A1 | 5/2003 | Arnott et al. | |
| 2003/0105923 A1 | 6/2003 | Bak et al. | |
| 2003/0115412 A1 | 6/2003 | Franklin et al. | |
| 2003/0221063 A1 | 11/2003 | Eguchi et al. | |
| 2004/0044865 A1 | 3/2004 | Sicola et al. | |
| 2004/0073831 A1 | 4/2004 | Yanai et al. | |
| 2004/0088483 A1 | 5/2004 | Chatterjee et al. | |
| 2004/0250031 A1 | 12/2004 | Ji et al. | |
| 2004/0255189 A1 | 12/2004 | Chu et al. | |
| 2005/0091391 A1 | 4/2005 | Burton et al. | |
| 2005/0102441 A1 | 5/2005 | Yeh et al. | |
| 2005/0114350 A1 | 5/2005 | Rose et al. | |
| 2005/0273565 A1 | 12/2005 | Hirakawa et al. | |
| 2005/0278476 A1 | 12/2005 | Teske et al. | |
| 2006/0236064 A1 * | 10/2006 | Niles et al. | 711/170 |
| 2006/0242540 A1 | 10/2006 | Cherian et al. | |
| 2007/0174657 A1 | 7/2007 | Ahmadian et al. | |
| 2008/0028107 A1 | 1/2008 | Cherian et al. | |
| 2008/0201616 A1 | 8/2008 | Ashmore | |

OTHER PUBLICATIONS

U.S. Official Action dated Oct. 5, 2009 in U.S. Appl. No. 11/551,291.
U.S. Official Action dated Aug. 17, 2009 in U.S. Appl. No. 11/551,303.
U.S. Official Action dated Jul. 8, 2009 in U.S. Appl. No. 11/551,311.
U.S. Official Action dated Dec. 28, 2009 in U.S. Appl. No. 11/551,311.
U.S. Official Action dated Oct. 14, 2009 in U.S. Appl. No. 11/695,854.
U.S. Official Action dated Dec. 23, 2008 in U.S. Appl. No. 11/551,311.
U.S. Official Action dated Mar. 16, 2009 in U.S. Appl. No. 11/551,303.
U.S. Appl. No. 11/551,291, filed Oct. 20, 2006, entitled "Providing Redundancy in a Storage System," Inventors: Chatterjee et al.
U.S. Appl. No. 11/551,303, filed Oct. 20, 2006, entitled "Background Movement of Data Between Nodes in a Storage Cluster," Inventors: Chatterjee et al.
U.S. Appl. No. 11/551,311, filed Oct. 20, 2006, entitled "Distributed Hot-Spare Storage in a Storage Cluster," Inventors: Chatterjee et al.
U.S. Appl. No. 11/695,854, filed Apr. 3, 2007, entitled "Asynchronous Data Replication", Inventors: Chatterjee et al.
U.S. Appl. No. 12/013,116, filed Jan. 11, 2008, entitled "Maintaining Data Consistency in Mirrored Cluster Storage Systems With Write-Back Cache," Inventors: Chatterjee et al.
U.S. Official Action dated Mar. 20, 2009 in U.S. Appl. No. 11/551,291.
U.S. Official Action dated Apr. 30, 2009 in U.S. Appl. No. 11/695,854.
Intel "PRO/10 Adapter: Reducing Bottlenecks for Maximum Performance," 2004. URL: http://www.intel.com/support/network/adapter/pro100/sb/cs-010531.htm, 5 pages.
U.S. Official Action dated Jul. 28, 2008 in U.S. Appl. No. 11/551,303.
U.S. Official Action dated Jul. 8, 2010 in U.S. Appl. No. 12/013,116.
U.S. Official Action dated Jul. 22, 2010 in U.S. Appl. No. 11/551,311.
U.S. Official Action dated Dec. 27, 2010 in U.S. Appl. No. 12/492,509.

* cited by examiner

MAINTAINING DATA CONSISTENCY IN MIRRORED CLUSTER STORAGE SYSTEMS USING BITMAP WRITE-INTENT LOGGING

CROSS-REFERENCE TO RELATED APPLICATIONS

This application claims the benefit of U.S. provisional patent application No. 60/898,432, filed on Jan. 30, 2007, and entitled "Novel Method of Maintaining Data Consistency in Mirrored Cluster Storage Systems across Power Failures using Bitmap Write-Intent Logging," which is expressly incorporated herein by reference in its entirety.

BACKGROUND

A virtualized cluster is a cluster of different storage nodes that together expose a single storage device. Input/Output operations ("I/Os") sent to the cluster are internally re-routed to read and write data to the appropriate locations. In this regard, a virtualized cluster of storage nodes can be considered analogous to collection of disks in a Redundant Array of Inexpensive Disks ("RAID") configuration, since a virtualized cluster hides the internal details of the cluster's operation from initiators and presents a unified device instead.

In a virtualized cluster, data may also be mirrored between nodes such that copies of the data are stored in two or more locations. In a mirrored system, the data may still be available at a second node should a first node become unavailable because of hardware failure, network congestion, link failure, or otherwise. In a mirrored system, the data on each node is duplicated to other storage units. Duplication can be made at the same time as an initial write I/O or it can be done later, in a background operation. When the duplication is done at the same time as an initial write, it is called a synchronous duplication. In contrast, a later duplication performed in the background may be called an asynchronous duplication. In either synchronous or asynchronous mirroring systems, one of the main requirements of operation is to maintain the consistency of data across all of the mirror nodes. This results in predictable data retrieval irrespective of the mirrored storage node from which the data is accessed.

Data can be written to a storage node by issuing an I/O request to the node. The I/O request is issued by an initiator. The initiator may be another node, a computer, an application on a computer, or a user of a computer. When data is written to a storage node, that node may be referred to as a primary node. The primary node may then mirror the data to one or more other nodes that can be referred to as secondary nodes. Again, it is an important operational requirement that data between mirrored nodes be consistent. Because all of the data writes at each respective one of the mirrored volumes may not be instantaneous, or atomic, data inconsistencies may occur due to any one of various pathological scenarios.

One pathological scenario occurs when the primary node stores new data and then attempts to mirror the data to a secondary node, but the attempt fails. This failure may be due to a network link failure, a hardware failure at the secondary, or several other factors. Another pathological scenario occurs when the primary stores data and then mirrors the data to a secondary node but the secondary system suffers a power failure before or during the write of the new data to disk. In all of these scenarios, and other mirroring failure scenarios, the nodes may eventually come back on line with inconsistent data on mirrored nodes. This is highly undesirable since an initiator may now retrieve different data depending upon which mirrored node the request is issued.

A drive cache is generally data stored in memory that duplicates data stored on the associated disk drive. Since memory is typically much faster than a drive, the drive data is slow to fetch relative to the speed of reading the cache. In other words, a cache is a temporary, fast storage area where data can be stored for rapid access. Once data is stored in a cache, future use can be made by accessing the cached instead of accessing the slower drive data. In a write-through cache system, every write is written to both the cache and the drive. In contrast, a write-back cache system stores every write into the cache but may not immediately store the write into the drive. Instead, the write-back cache system tracks which cache memory locations have been modified by marking those cache entries as "dirty". The data in the dirty cache locations are written back to the drive when triggered at a later time. Writing back of the dirty cache entries upon such a trigger is referred to as "flushing the cache" or "flushing the cache to disk". Example triggers to flush the cache include eviction of the cache entry, shutting down the drive, or periodic cache flushing timers. A write-back cache system is also referred to as a write-behind cache system.

Additional complications to the pathological scenarios described above occur when write-back cache is used in a primary and/or secondary storage node. For example, both a primary and a secondary storage node may have received the same data to be mirrored, but the data is cached and has not yet been flushed to disk when one of the nodes suffers a power failure. In this instance, one of the data write I/Os was received but not made persistent on the disk drive. Thus, the data will be inconsistent between the two storage nodes after the power failure completes.

It is with respect to these considerations and others that the disclosure made herein is presented.

SUMMARY

Technologies are described herein for maintaining data consistency across mirrored storage nodes. Through the utilization of the technologies and concepts presented herein, data consistency may be maintained in networked storage environments using a write-intent log that first records the intent to write data before writing the data into multiple locations. Only once all of the location writes are complete, is the record in the write-intent log cleared. The write-intent log can use a bitmap to flag the portions of a storage system where a write is to occur. This flagging may be provided by setting appropriate bits within the bitmap. The bitmap can be referred to as an "event gate bitmap" or simply a "gate bitmap". Moreover, technology presented herein supports processing and storage of the gate bitmaps such that data consistency may be gracefully maintained across power failures.

According to one aspect presented herein, any I/O received at a mirror node is gated prior to execution. This gating can include setting the appropriate bit within the gate bitmap and then storing the gate bitmap to disk. Flagging the gate bitmap and then storing the gate bitmap to disk ensures that the intent to perform the I/O has been stored in a non-volatile medium that will persist across a power loss. This technique can protect against inconsistencies caused by I/Os that are outstanding during a power failure at one of the nodes. Storing the gate bitmap to disk can include alternating between two different locations on the disk so that one copy of the gate bitmap is always stored in its entirety. A system of I/O queues and I/O counters may be used to set and clear the gating bits within the gate bitmap. I/O gating may be performed at each storage node in a distributed storage system. For example, an I/O request may be received at a first node where it is gated and relayed to a second node for mirroring. At the second node, the I/O request may also be gated.

According to another aspect, complications due to write-back cache may be mitigated using write gating. When data is in a write-back cache but has not yet been stored to the associated disk, that data is considered a dirty cache entry. While disk storage is non-volatile, a system's main memory is generally volatile. Since a disk cache may be in a system's main memory, or otherwise volatile memory, dirty cache entries will be lost during a power failure event. This loss may result in inconsistent data between mirrored nodes. Write-gating can mitigate these issues by gating data stored on a system using write-back cache. Bits corresponding to a write I/O can be set in the gate bitmap and then only cleared once the written data is flushed to disk from the cache. Note that the gate bitmap itself is not cached and should be persisted on disk to ensure that the data on the write-back cache is guarded for mirror-consistency on a power failure.

Yet another aspect of write gating can protect against the loss of data consistency between the mirrored nodes caused by network link failure or power outages. A functioning mirrored node can maintain a delta list, or change list, recording the accumulated differences between data stored on that node and the data on the unreachable node. This delta may also be referred to as a "tab". The tab may be of a finer spatial granularity than the gate. The tab may also be persisted to disk to protect its contents across local power failures.

According to other aspects, the gate bitmap granularity can be adjusted from fine-grained to comparatively coarser granularities based on various system parameters. Granularity of the gate bitmap can provide an indication of the size of the disk area represented by each gate bit. As a limiting example, the finest granularity would provide a gate bit for each sector, or storage unit, of the disk. Such a fine granularity would likely have very poor performance because each sector access would require updating and storing the gate bitmap. On the other hand, having too coarse of a granularity setting may cause unnecessarily large sections of the disk be resynchronized after a fault or power loss. Adjusting the granularity between these two extremes can establish a suitable granularity for the gating system. Establishing this suitable granularity can impact overall performance of the distributed, mirrored storage system.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
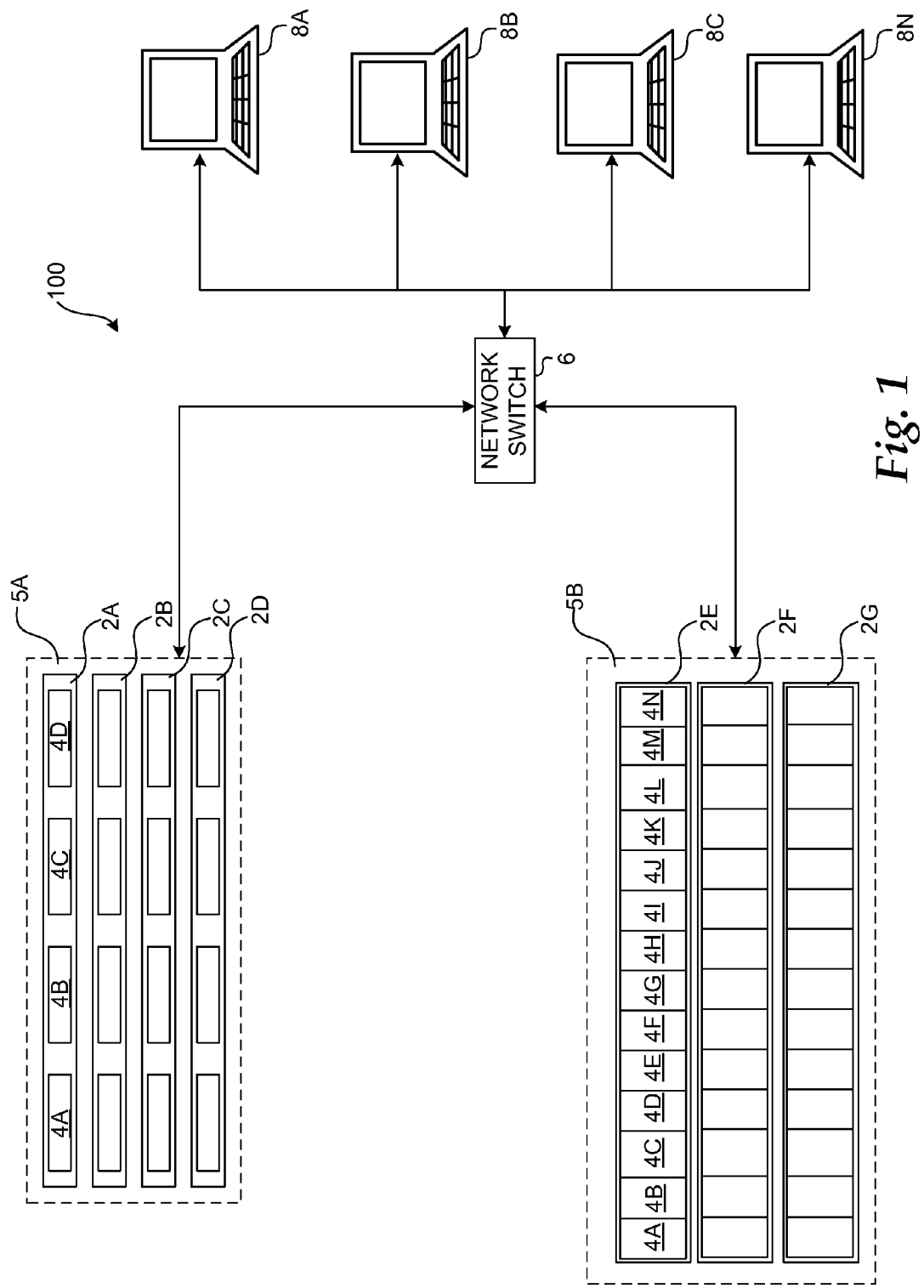
FIG. 1 is a network architecture diagram illustrating aspects of a storage system that includes several virtualized clusters according to one exemplary embodiment.

The following detailed description is directed to technologies for maintaining data consistency across mirrored storage nodes. Through the use of the embodiments presented herein, data consistency may be maintained in networked storage environments using write-intent gating that first records the intent to write data before writing the data into multiple mirrored storage nodes of a distributed storage system.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for mirrored storage data consistency using write-intent gating will be described.

Turning now to FIG. 1, details will be provided regarding an illustrative operating environment for the implementations presented herein, as well as aspects of several software components that provide the functionality described herein for mirrored storage data consistency using write-intent gating. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B include the storage server computers 2A-2G (also referred to herein as "storage nodes" or a "node") that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D. Alternatively, each node may be housed in a three rack space unit storing up to fifteen hard disk drives. For instance, the node 2E includes fourteen hard disk drives 4A-4N. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to field I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network ("LAN") as the clusters 5A-5B or may be connected to the clusters 5A-5B via a distributed wide area network, such as the Internet. An appropriate protocol, such as the Internet Small Computer Systems Interface ("iSCSI") protocol may be utilized to enable the initiators 8A-8D to communicate with and utilize the various functions of the storage clusters 5A-5B over a wide area network such as the Internet.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Figure 2:
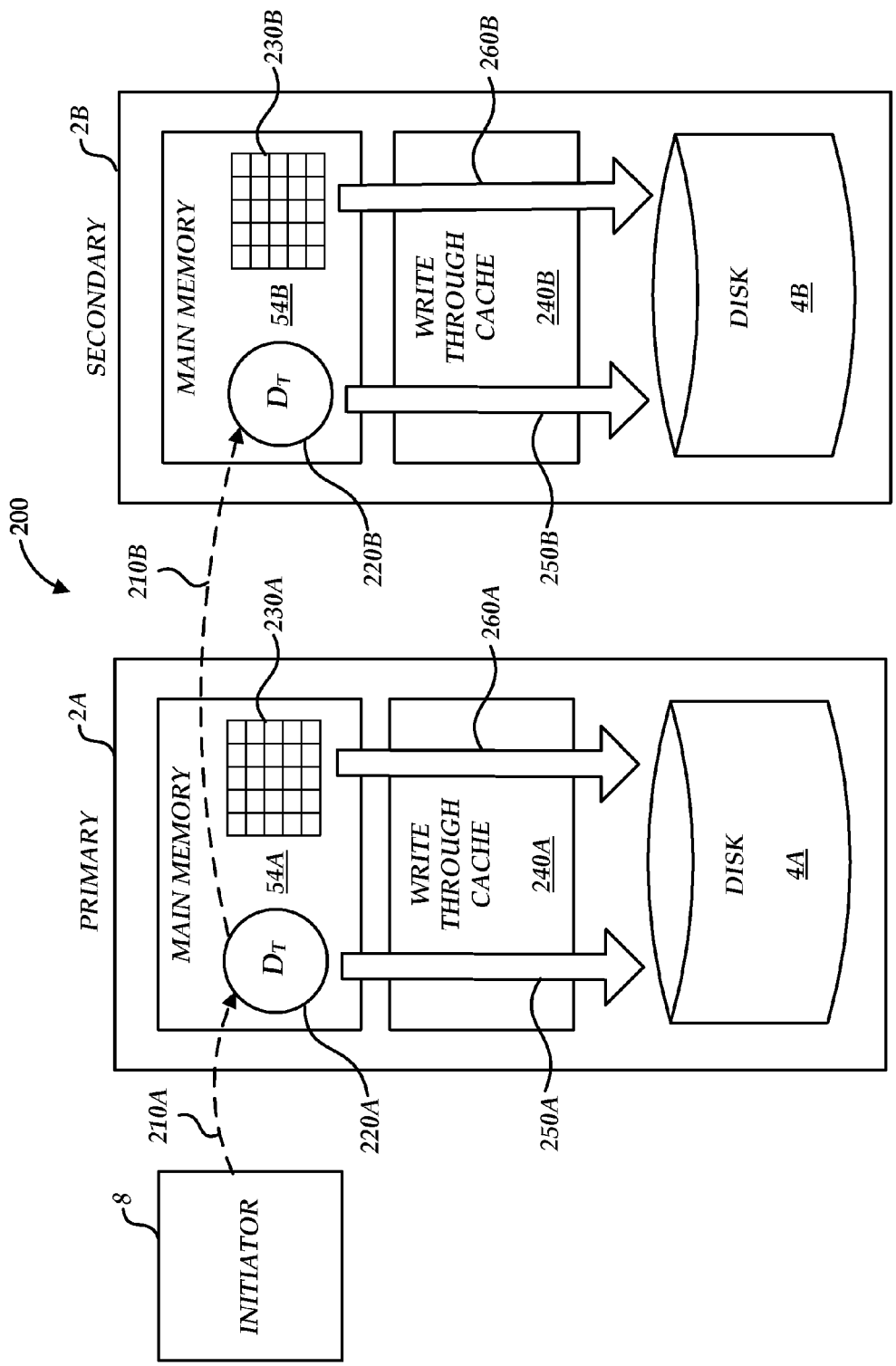
FIG. 2 is a functional architecture diagram illustrating a mirrored storage system where storage nodes employ write-intent gating according to one exemplary embodiment.

Referring now to FIG. 2, a mirrored storage system 200 is illustrated where the storage nodes 2A-2B employ write-intent gating according to one exemplary embodiment. A data I/O 210A from an initiator 8 is issued to a primary storage node 2A. The primary storage node 2A is mirrored with a secondary storage node 2B. A synchronizing I/O 210B can be relayed to the secondary storage node 2B from the primary storage node 2A in order to establish and maintain data mirroring. The synchronizing I/O 210B may be identical in payload to the original data I/O 210A. The data I/O 210A can request, as one I/O example, the storage of data $D_T$ 220A within the storage system 200. Upon initial receipt at the primary storage node 2A, the I/O 210A, including its associated data $D_T$ 220A may be located within the main memory 54A of the primary storage node 2A.

Gating within the primary storage node 2A can delay the performance, and mirroring, of the I/O 210A until the intent to perform the I/O 210A is recorded within the primary storage node 2A. The write intent can be recorded by flagging a bit in a gate bitmap 230A. The gate bitmap 230A may initially be located within the main memory 54A of the primary storage node 2A. After flagging the write intent bit within the gate bitmap 230A, the gate bitmap 230A can be written 260A to a mass storage device within the primary storage node 2A. This write 260A to a mass storage device can ensure the persistence of the write intent across a failure. The mass storage may include, as one example, a hard disk 4A.

The gate bitmap 230A can be used to represent an entire disk 4A. Initially, all of the entries in the gate bitmap 230A can be set to zero. Each particular bit within the gate bitmap 230A can be set to one as it is used to record an intent to write within the space on the disk 4A represented by the respective bit within the gate bitmap 230A. The amount of the space represented by each bit, or flag, within the gate bitmap 230A can be determined by the granularity of the gate bitmap 230A. A finer granularity may imply that each bit within the gate bitmap 230A represents a smaller portion of the disk 4A. A coarser granularity may imply that each bit within the gate bitmap 230A represents a larger portion of the disk 4A. Thus, for a given size disk 4A, a finer granularity gate bitmap 230A would be larger, or have more bits, than would a coarser granularity gate bitmap 230A.

Once the writing 260A of gate bitmap 230A to disk 4A is verified, the actual performance of the I/O 210A can be carried out. Also, the synchronizing I/O 210B can be released to the secondary storage node 2B. Not until completion of both the actual performance of the I/O 210A and the synchronizing I/O 210B will the intent flag within gate bitmap 230A be cleared, or set to zero. The actual performance of the I/O 210A can include, in this data I/O example, the writing 250A of data $D_T$ 220A onto disk 4A. The synchronizing I/O 210B can initiate a similarly gated storage process on a secondary storage node 2B as detailed hereinafter.

Both the writing 250A of data $D_T$ 220A and the writing 260A of gate bitmap 230A to disk 4A can occur through a write-through cache 240A. Disk caching that uses write-through cache 240A can include simultaneous writes to disk 4A and cache 240A. Thus, cache entries in write-through cache systems are never dirty and there can be no risk of cache data loss, during a power failure.

Upon arrival at the secondary storage node 2B, the synchronizing I/O 210B, including its associated data $D_T$ 220B may be located within the main memory 54B of the secondary storage node 2B. Gating within the secondary storage node 2B can delay the performance of the synchronizing I/O 210B until the intent to perform the synchronizing I/O 210B is recorded within the secondary storage node 2B. The write intent can be recorded by flagging a bit in a gate bitmap 230B. The gate bitmap 230B may initially be located within the main memory 54B of the secondary storage node 2B. After flagging the write intent bit within the gate bitmap 230B, the gate bitmap 230B can be written 260B to a mass storage device within the secondary storage node 2B. Storing the gate bitmap 230B can ensure the persistence of the write intent across a power failure. The mass storage may include, as one example, a hard disk 4B.

Once the writing 260B of gate bitmap 230B to disk 4B is verified, the actual performance of the synchronizing I/O 210B can be carried out. Not until completion of the actual performance of the synchronizing I/O 210B will the intent flag within gate bitmap 230B be cleared, or set to zero. The actual performance of the synchronizing I/O 210B can include, in this data I/O example, the writing 250B of data $D_T$ 220B onto disk 4B. Both the writing 250B of data $D_T$ 220B and the writing 260B of gate bitmap 230B to disk 4B can occur through write-through cache 240B. Not until completion of the performance of the synchronizing I/O 210B and the clearing of the intent flag within gate bitmap 230B will the synchronizing I/O 210B be acknowledged back to the primary storage node 2A as complete.

Considering a first pathological condition of a power failure at a secondary storage node 2B, the primary storage node 2A may have successfully performed the data I/O 210A while a power failure may occur at the secondary storage node 2B. The power failure may occur after the secondary storage node 2B receives the synchronizing I/O 210B but before the secondary storage node 2B writes 250B the data $D_T$ 220B to disk 4B. Such a scenario can leave the distributed storage system 200 in a state of inconsistent data where the disk 4A of the primary storage node 2A contains data $D_T$ 220B but the disk 4B at the secondary storage node 2B contains data $D_{T-1}$ since the writing 250B of data $D_T$ 220B did not complete at the secondary storage node 2B due to the power failure. Here, data $D_{T-1}$ denotes the previous state of a data record (or file, sector, stripe, block, etc.) prior to the updating of the stored data to $D_T$ by the data I/O 210A-210B.

This pathological condition of power failure at the secondary storage node 2B may be mitigated using write intent gating. For example, the intent flag within the gate bitmap 230A at the primary storage node 2A can remain set until completion of both local performance of I/O 210A and the synchronizing I/O 210B. Since the synchronizing I/O 210B would not have completed in the pathological case of secondary node 2B power failure, the write intent bit within the gate bitmap 230A would not have cleared. Since the write intent bit within the gate bitmap 230A may remain flagged, the inconsistent data condition can be corrected once the secondary storage node 2B comes back online. Furthermore, the local write intent gating within the secondary storage node 2B may locally correct the failed write 250B of data 220B once the secondary storage node 2B powers back up.

Considering a second pathological condition of power failure at the primary storage node 2A, the primary storage node 2A may issue a synchronizing I/O 210B to the secondary storage node 2B where the I/O 210B is successfully performed while a power failure at the primary storage node 2A may prevent complete performance of the data I/O 210A at the primary storage node 2A. Such a scenario can leave the distributed storage system 200 in a state of inconsistent data where the disk 4A of the primary storage node 2A contains data $D_{T-1}$ but the disk 4B at the secondary storage node 2B contains data $D_T$ 220B. This pathological condition of power failure at the primary storage node 2A may be mitigated using write intent gating. For example, the intent flag within the gate bitmap 230A can remain set until completion of both the local performance of I/O 210A and the synchronizing I/O 210B. Since the local performance of I/O 210A would not have completed in the pathological case of primary node 2A power failure, the write intent bit within the gate bitmap 230A would not have cleared. Since the write intent bit within the gate bitmap 230A may remain flagged, and the gate bitmap 230A can be persisted to disk before performing the I/O, the inconsistent data condition can be corrected once the power comes back online at the primary storage node 2A.

Considering a third pathological scenario, a link failure between the primary storage node 2A and the secondary storage node 2B can prevent, entirely, the primary storage node 2A from issuing a synchronizing I/O 210B to the secondary storage node 2B. An existing power failure at the secondary storage node 2B can create the same complication. Such a scenario can leave the distributed storage system 200 in a state of inconsistent data where the disk 4A of the primary storage node 2A contains data $D_T$ 220B but the disk 4B at the secondary storage node 2B contains data $D_{T-1}$ since the synchronizing I/O 210B was never received by the secondary storage node 2B. This pathological condition of link failure between the primary storage node 2A and the secondary storage node 2B may be mitigated using write intent gating. For example, the intent flag within the gate bitmap 230A can remain set until the completion of both local performance of the I/O 210A and the synchronizing I/O 210B.

Since the synchronizing I/O 210B would not have completed in the pathological case of link failure, the write intent bit within the gate bitmap 230A would not have cleared. Since the write intent bit within the gate bitmap 230A may remain flagged, the inconsistent data condition can be corrected once the secondary storage node 2B comes back online. Furthermore, the primary storage node 2A can maintain a delta record of I/O requests that occur while the secondary storage node 2B is unavailable. This delta record may be referred to as a tab. The tab can be maintained in the main memory of the primary storage node 2A and can be persisted to disk 4A to maintain the tab across power failures at the primary storage node 2A. By relaying all of the missed I/O requests maintained within the tab, the tab can be cleared once the link between the primary storage node 2A and the secondary storage node 2B is restored. Since the tab contains the details of the missed I/Os, and a flag within the gate bitmap 230A indicates that an entire portion of the disk 4A must be resynchronized, the tab can be of a much finer granularity than of the gate bitmap 230A.

While FIG. 2 illustrates an exemplary embodiment with two mirrored storage nodes 2A-2B, the storage system 200 may also mirror data between any number of storage nodes. Also, the identification of one node as a primary storage node 2A and another node as a secondary storage node 2B may be arbitrary. The initiator 8 may process a data I/O 210A with any of the nodes in a mirrored set making that node the primary node 2A in that instance. That primary node 2A may then issue synchronizing I/O requests 210B with the other nodes in the mirrored set.

Figure 3:
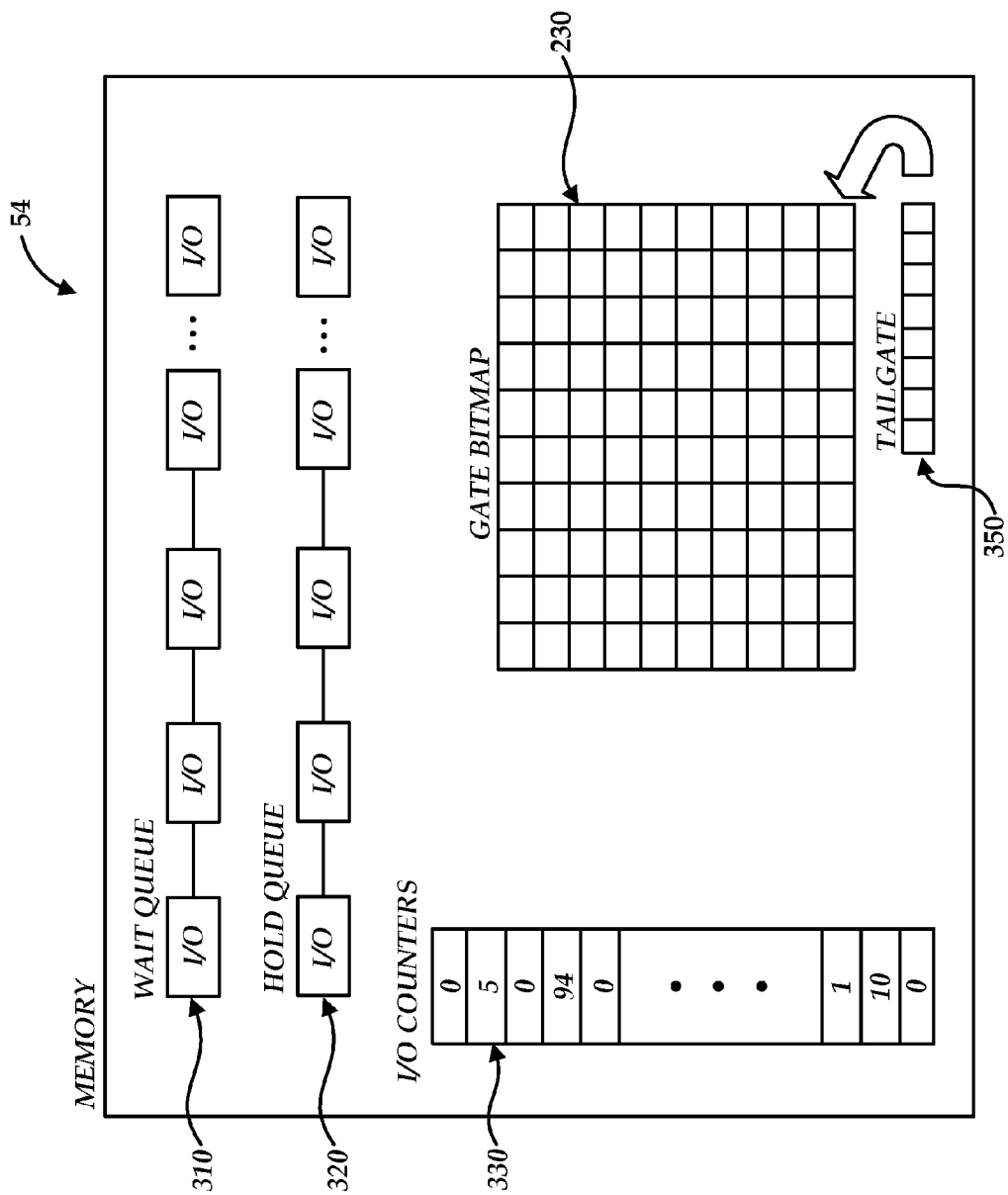
FIG. 3 is a data structure diagram illustrating elements used in write gating according to one exemplary embodiment.

Referring now to FIG. 3, data structures used in write gating are illustrated according to one exemplary embodiment. A gate bitmap 230 can be used to represent an entire disk 4. Initially, all of the entries in the gate bitmap 230 can be set to zero. Each particular bit within the gate bitmap 230 can be set to one as it is used to record an intent to write within the space on the disk 4 represented by the respective bit within the gate bitmap 230.

The gate bitmap 230 can be sized relative to some physical or logical parameter of the disk 4 so as to leverage efficiency in frequent writes of the gate bitmap 230 to the disk 4. For example, the gate bit map 230 can be sized to fit within one RAID stripe of the disk 4. A given disk 4 may use more than one gate bitmap 230 if, as an example, the desired size of the gate bitmap 230 spans two RAID stripes, or other efficient portion of the disk 4. In such a case, two gate bitmaps 230 can be established each covering half, or some other division, of the disk 4 and the two gate bitmaps 230 can be stored to disk 4 independently as needed.

The amount of the space represented by each bit, or flag, within the gate bitmap 230 can be determined by the granularity of the gate bitmap 230. A finer granularity may imply that each bit within the gate bitmap 230 represents a smaller portion of the disk 4. A coarser granularity may imply that each bit within the gate bitmap 230 represents a larger portion of the disk 4. Thus, for a given size disk 4, a finer granularity gate bitmap 230 would be larger, or have more bits, than would a coarser granularity gate bitmap 230. Selecting the appropriate granularity of the gate bitmap 230 can be a tradeoff between selecting a fine granularity that can reduce the amount of disk 4 space associated with each gate bit, and a coarse granularity that can reduce the number of times that the gate bitmap 230 will need to be flushed to disk 4. Considering one example, each bit in the gate bitmap 230 can account for 8 MB of data on the disk 4. In this case, outstanding I/Os and cached data falling in the same 8 MB region are logged as a single entry (or bit, or flag) in the gate bitmap 230. After the first I/O causes the proper bit within the gate bitmap 230 to be flagged, subsequent I/Os can be processed without modifying and storing the gate bitmap 230.

The choice of the gate granularity can be influenced by several additional factors including write latency of the disk 4, locality of reference, and link delay. With respect to write latency of the disk 4, fine granularities for the gate bitmap 230 may result in almost every I/O 210 having to wait for a gate flush 260 to complete before the I/O 210 can be performed. This can drastically impact application write time and is not desirable. With respect to locality of reference, application writes can be statistically localized temporarily and spatially. For example, there can be a burst of I/Os to small areas of the disk 4 over a short period of time. Furthermore, certain types of data, such as logs, media files, or databases may be accessed sequentially. Thus, coarser granularity of the gate bitmap 230 can ensure that more outstanding I/Os hit the same gate region and thus do not need to wait for a gate bitmap flush 260 prior to performing the I/O 210. With respect to link delay, a coarse granularity of the gate bitmap 230 can require more data to be synchronized between the mirrored nodes thereby increasing resynchronization times and network usage. Balancing between these factors, as well as considering the relationship between gate bitmap 230 size and RAID stripe size as discussed previously, can provide a framework for selecting a gate bitmap 230 granularity that best suits a particular storage system 200.

A vector of bits at the end of the gate bitmap 230 can be used for additional control and configuration metadata. This vector of bits may be referred to as the tailgate 350. The tailgate 350 may be within the gate bitmap 230. Two or more bits in the tailgate 350 may be used to indicate the granularity of the gate bitmap 230. The granularities could be coded as, for example, 2 MB, 4 MB, 8 MB, or 16 MB for each gate bit. The granularity of the gate bitmap 230 may be dynamically increased or decreased during run-time. The tailgate 350 does not need to be stored in local memory 54 along with the rest of the gate bitmap 230. The tailgate 350 can be updated into the end of the gate bitmap 230 right before, or while, the gate bitmap 230 is being written to disk 4.

The gate bitmap 230 may be double buffered on disk 4. That is, successive writes of the gate bitmap 230 to disk 4 may alternate between two distinct areas on the disk 4. This technique ensures that an entire gate bitmap 230 image is always available on the disk. If power was lost in the middle of writing a gate bitmap 230 image to disk 4, the immediately prior stored gate bitmap 230 image may still be available in the alternate location on the disk 4.

The tailgate 350 can also contain a sequence number used to identify the latest gate bitmap 230 on the disk 4. Since the sequence number can be stored in the tailgate 350 and the tailgate 350 can be at the end of the gate bitmap 230, the sequence number may be written to the disk 4 after the write of the entire gate bitmap 230 is successful. Thus, the existence of a higher sequence number in a gate bitmap 230 image stored on a disk 4 can indicate that the stored gate bitmap 230 is the latest one stored to disk and that it is an entire gate bitmap 230 image. When a storage node 2 powers up, both gate bitmap 230 storage locations on the disk 4 can be examined. The gate bitmap 230 image on the disk 4 with the highest sequence number can then be loaded into local memory 54 for use. The process of selecting the highest sequence number can adjust for the wrapping of the sequence number counter at its high limit.

The gate bitmap 230 can be split to represents multiple separate gates related to multiple secondary nodes 2. For example, if one node 2A is mirrored with two separate nodes 2B, the space for the gate bitmap 230 may be split into two separate gate bitmaps 230 where a first split is related to a first mirrored node 2A and a second slit is related to a second mirrored node 2B. These independent gate bitmaps 230 may allow synchronizing I/Os to each of the mirrored nodes to be gated independently at the primary node.

An I/O counter 330 can maintain a count for each gate bit in the gate bitmap 230. The count in the I/O counter 330 can indicate how many I/Os are pending related to a given gate bit in the gate bitmap 230. After an I/O for a given gate bit completes, the I/O counter 330 related to that gate bit can be decremented. Only if the I/O counter 330 for that gate bit is zero will the gate bit be cleared. Since a single gate bit may indicate multiple pending I/Os for the same gated area of the disk 4, use of the I/O counter 330 can allow all pending I/Os related to a given gate bit to compete before the gate bit is cleared in the gate bitmap 230.

Each gate bit in the gate bitmap 230 may have two I/O queues associated with it. The two I/O queues are the wait queue 310 and the hold queue 320. Each of the two queues 310, 320 may be implemented as linked lists, double linked lists, arrays, arrays of structures, FIFO buffers, or any other data structure or mechanism to store I/Os. The wait queue 310 temporarily queues I/O requests 210 prior to the corresponding gate bit being set in the gate bitmap 230. Once the corresponding gate bitmap 230 entry is made, the I/O may be moved to the hold queue 320. The I/O can remain in the hold queue 320 until the gate bitmap 230 is stored, and flushed, to the disk 4. After the updated gate bitmap 230 is stored, and flushed, to the disk 4, the I/O can be removed to the hold queue 320 and the I/O request 210 can be performed. Additional details regarding the I/O counter 330 and the I/O queues 310, 320 will be presented below with respect to FIGS. 6-7.

Figure 4:
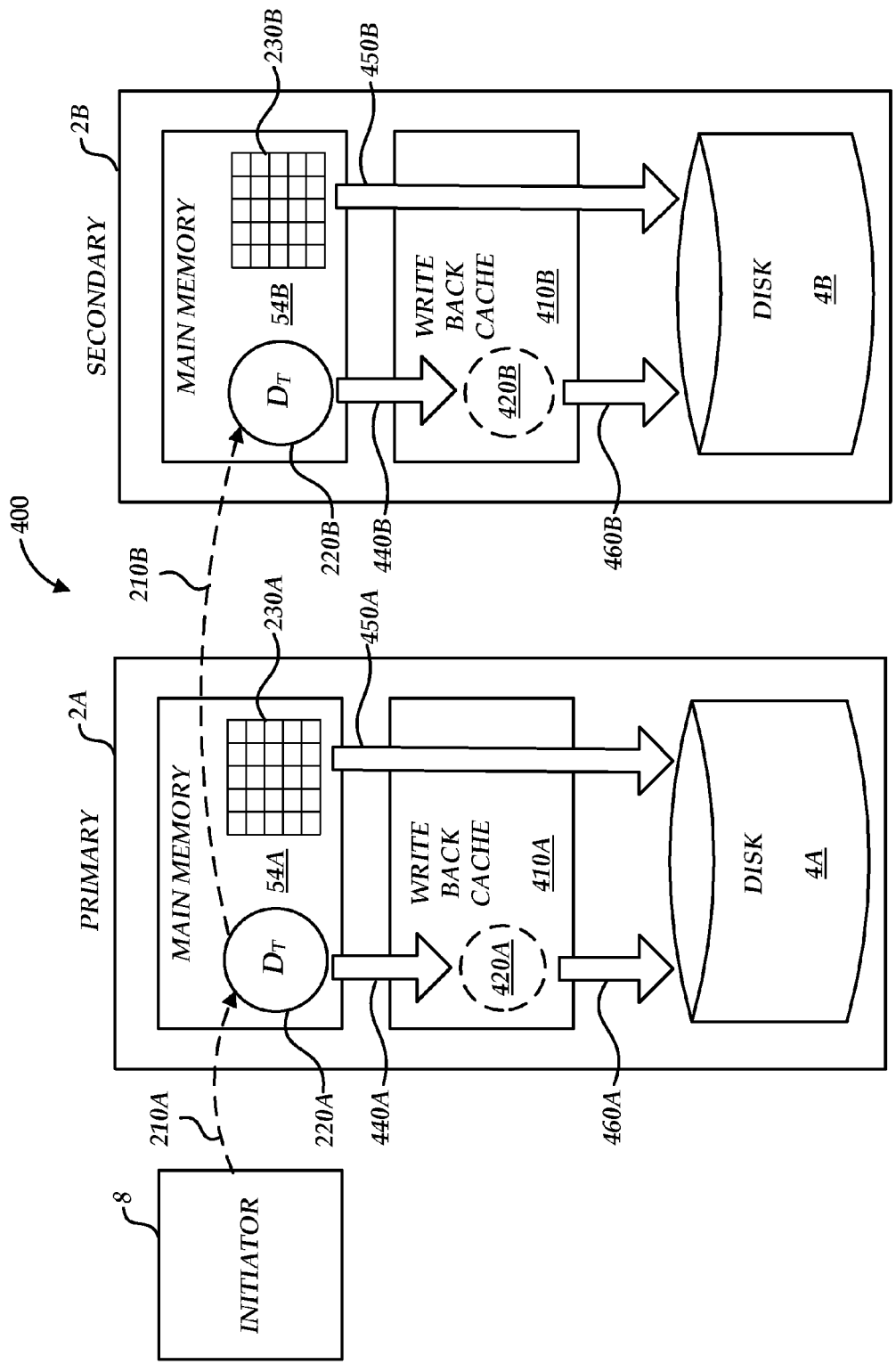
FIG. 4 is a functional architecture diagram illustrating a mirrored storage system where storage nodes employ write-intent gating according to one exemplary embodiment.

Referring now to FIG. 4, a mirrored storage system 400 is illustrated where the storage nodes 2A-2B employ write-intent gating according to one exemplary embodiment. A data I/O 210A from an initiator 8 is issued to a primary storage node 2A. The primary storage node 2A is mirrored with a secondary storage node 2B. Accordingly, a synchronizing I/O 210B can be issued to the secondary storage node 2B from the primary storage node 2A to establish, and maintain, mirroring. The synchronizing I/O 210B may be identical in payload to the original data I/O 210A. The data I/O 210A can request, as one I/O example, the storage of data $D_T$ 220A within the storage system 400. Upon initial receipt at the primary storage node 2A, the I/O 210A, including its associated data $D_T$ 220A may be located within the main memory 54A of the primary storage node 2A.

Gating within the primary storage node 2A can delay the execution and mirroring of the I/O 210A until the intent to perform the I/O 210A is recorded within the primary storage node 2A. The write intent can be recorded by flagging a bit in a gate bitmap 230A. The gate bitmap 230A may initially be located within the main memory 54A of the primary storage node 2A. After flagging the write intent bit within gate bitmap 230A, the gate bitmap 230A can be written 450A to disk 4A within the primary storage node 2A. Writing 450A the gate bitmap 230A to disk 4A can ensure the persistence of the write intent across a power failure. The writing of gate bitmap 230A to disk 4A can be verified prior to carrying out the actual performance of the I/O 210A. At the time, the synchronizing I/O 210B can also be released to the secondary storage node 2B. Not until completion of both the actual local performance of the I/O 210A and the synchronizing I/O 210B will the intent flag within gate bitmap 230A be cleared, or set to zero. The actual performance of the I/O 210A can include, in this data I/O example, the writing of data $D_T$ 220A onto disk 4A followed by flushing of the cached data 420A from the write-back cache 410A to the disk 4A. The synchronizing I/O 210B can initiate a similarly gated storage process on secondary storage node 2B.

Writing of data $D_T$ 220A to disk 4A may first include writing into the write-back cache 410A and then include cache entry flushes from the write-back cache 410A to the disk 4A. For example, in writing data $D_T$ 220A to disk 4A, the data $D_T$ 220A can first be written 440A into write-back cache 410A where the cached version of the data 420A can remain, as a dirty cache entry, until flushed 460A to disk 4A. In order to avoid data loss, flushing the write-back cache 410A to the disk 4A after some data writes may be necessary to ensure that the data 220A has been properly persisted to disk 4A.

Upon arrival at the secondary storage node 2B, the synchronizing I/O 210B, including its associated data $D_T$ 220B may be located within the main memory 54B of the secondary storage node 2B. Gating within the secondary storage node 2B can delay execution of the synchronizing I/O 210B until the intent to perform the synchronizing I/O 210B is recorded within the secondary storage node 2B. The write intent can be recorded by flagging a bit in a gate bitmap 230B. The gate bitmap 230B may initially be located within the main memory 54B of the secondary storage node 2B. After flagging the write intent bit within the gate bitmap 230B, the gate bitmap 230B can be written 450B to disk 4B within the secondary storage node 2B.

A writing 450B of the gate bitmap 230B to disk 4B can be verified prior to execution of the synchronizing I/O 210B. Not until completion of the actual performance of the synchronizing I/O 210B, including flushing of the data from the write-back cache 410B to disk 4B, will the intent flag within gate bitmap 230B be cleared, or set to zero. The actual performance of the synchronizing I/O 210B can include, in this data I/O example, the writing of data $D_T$ 220B onto disk 4B and the flushing of the write-back cache 410B. Not until completion of the performance of the synchronizing I/O 210B and the clearing of the intent flag within gate bitmap 230B will the synchronizing I/O 210B be acknowledged as complete back to the primary storage node 2A.

The writing of data $D_T$ 220B to disk 4B may first involve writing into the write-back cache 410B prior to subsequent write-back cache 410B flushes to the disk 4B. For example, in writing data $D_T$ 220B to disk 4B, the data $D_T$ 220B can first be written 440B into write-back cache 410B where the cached version of the data 420B can remain, as a dirty cache entry, until flushed 460B to disk 4B.

Considering a pathological condition of power failure at one of the storage nodes, the primary storage node 2A may write 440A data $D_T$ 220A into the write-back cache 410A where the cached version of the data 420A has not yet been flushed 460A to disk 4A when a power failure occurs. Such a scenario can leave the distributed storage system 400 in a state of data inconsistency where the disk 4A of the primary storage node 2A contains data $D_{T-1}$ but the disk 4B at the secondary storage node 2B contains data $D_T$ 220B. This pathological condition of power failure at the primary storage node 2A may be mitigated using write intent gating. For example, the intent flag within the gate bitmap 230A can remain set until completion of local execution of the I/O request 210A. Since the local execution of the I/O request 210A would not have completed in the pathological case of primary node 2A power failure, the write intent bit within the gate bitmap 230A would not have cleared. Since the write intent bit within the gate bitmap 230A may remain flagged, and the gate bitmap 230A can be persisted to disk 4A before performing the I/O, the inconsistent data condition can be easily corrected once the power comes back online.

Figure 5:
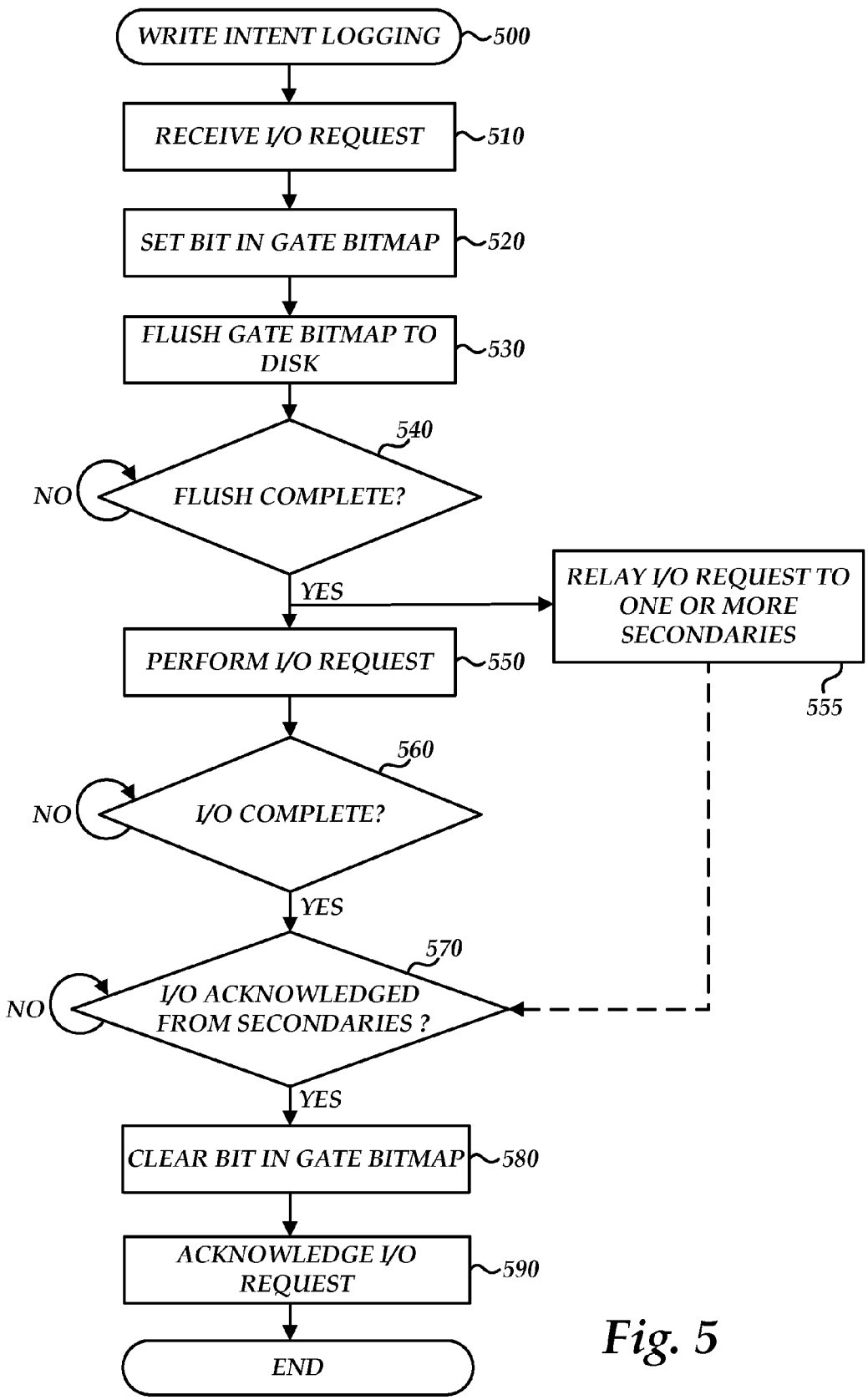
FIG. 5 is a logical flow diagram illustrating a process performed by a mirrored storage node for write intent logging according to one exemplary embodiment.

Turning now to FIG. 5, additional details will be provided regarding the embodiments presented herein for write intent logging. In particular, FIG. 5 is a flow diagram showing a routine 500 that illustrates aspects of an exemplary process performed by a mirrored storage node 2 for write intent logging. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 500 can begin with Operation 510 where a data I/O request 210 may be received at the storage node 2. The data I/O request 210 may originate from an initiator 8, such as an application, or from another storage node 2 that is performing a mirroring operation. The data I/O request 210 may be a request to store data into a mirrored data storage system 200,400.

At operation 520, the storage node 2 can set a bit in a gate bitmap 230 indicating intent to perform a write into the portion of the disk 4 that corresponds to the associated gate bit in the gate bitmap 230. At operation 530, the gate bitmap 230 can be stored off to disk 4. At operation 540, the status of the cache flush associated with operation 530 is evaluated. If the flush associated with operation 430 is not complete, operation 540 can wait until the flush is complete. Upon completion of the flush associated with operation 530, the routine 500 can progress to operations 550 and 555. Assuring that the gate bitmap 230 is persisted to the disk 4 before progressing to operations 550 and 555 can provide protection from loss of the gate bitmap 230 status across power loss events.

At operation 555, the data I/O request 210 is relayed to one or more secondary storage nodes 2B for mirroring. At the secondary storage nodes 2B, a similar procedure to routine 500 may be carried out.

At operation 550, the storage node 2 performs the I/O request 210. Performing the I/O request can include flushing the I/O data 220 from the disk cache to the disk 4. Operation 560 checks if the I/O and cache flush associated with operation 550 are complete. If the I/O 210 from operation 550 is not complete, the routine 500 can wait at operation 560. If the I/O 210 from step 550 is complete, the routine 500 can proceed to operation 570.

At operation 570, routine 500 can test if the I/Os 210 that were relayed to one or more secondary storage nodes 2 have been acknowledged as completed by the secondary storage nodes 2. These I/Os are also known as synchronizing I/Os as they can be used to synchronize the data between the primary storage node 2A and one or more secondary storage nodes 2B. If the synchronizing I/Os are not complete, routine 500 can wait at operation 570 for the acknowledgement(s) of completion. If the synchronizing I/Os are complete, then routine 500 can proceed to operation 580.

At operation 580, the gate bit in the gate bitmap 230 can be cleared since the local I/O and the synchronizing I/Os have been completed and flushed to disk. The gate bitmap 230 need not be stored and flushed after operation 580 since a bit clear is not a critical data consistency event. If the bit clear is lost due to power failure, it will simply be cleared later once a data resynchronization is completed. At this time, the routine 500 can enter operation 590 to acknowledge full completion of the I/O request 210 received in operation 510. This acknowledgement is made back to the initiator 8 of the I/O request 210. Routine 500 can end after operation 590.

Figure 6:
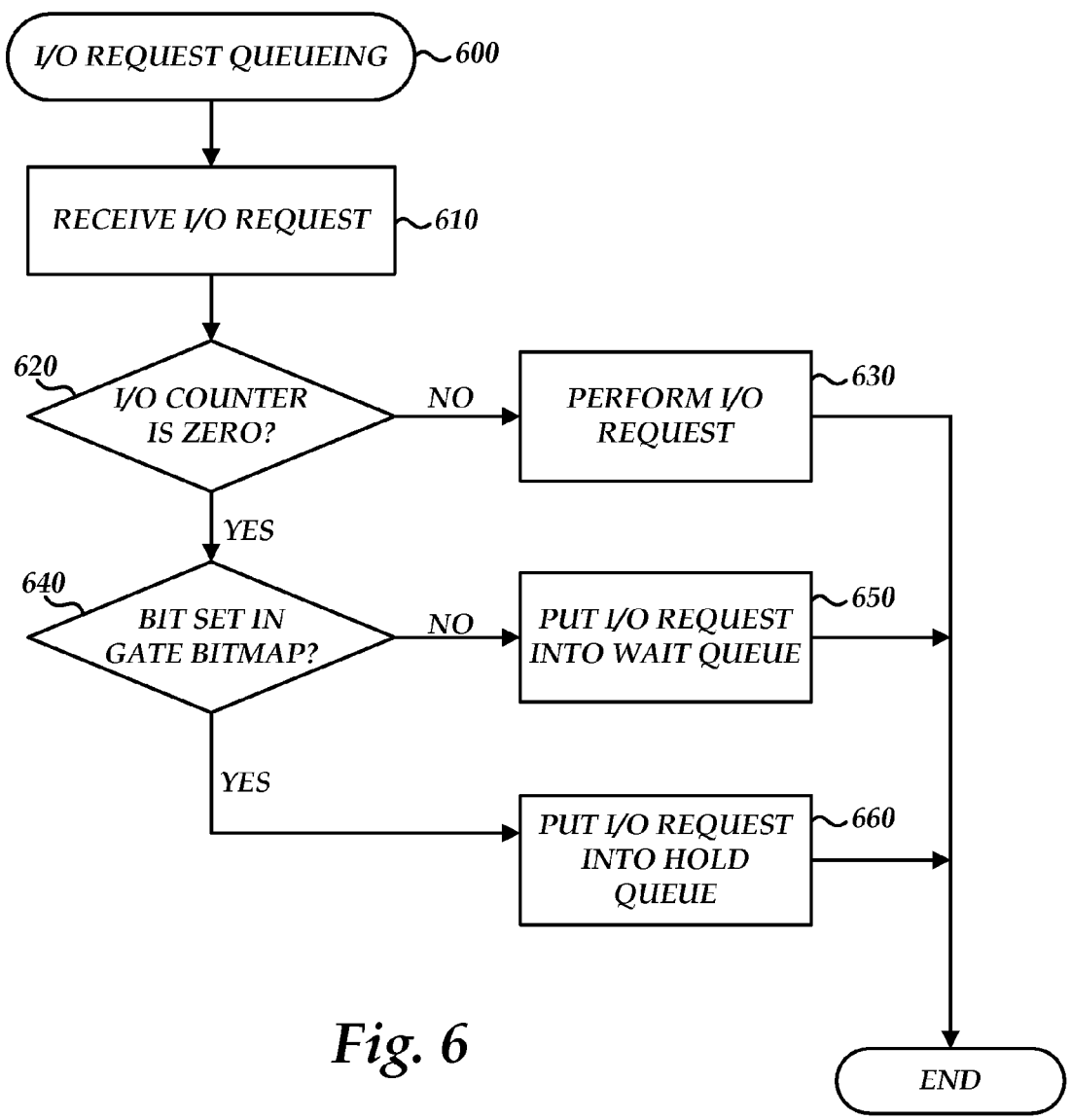
FIG. 6 is a logical flow diagram illustrating a process performed by a mirrored storage node for I/O request logging according to one exemplary embodiment.

Turning now to FIG. 6, additional details will be provided regarding the embodiments presented herein for I/O request logging. In particular, FIG. 6 is a flow diagram illustrating a routine 600 that shows aspects of an exemplary process performed by a mirrored storage node 2 for I/O request logging.

The routine 600 can begin with operation 610 where a data I/O request 210 may be received at the storage node 2. The data I/O request 210 may originate from an initiator 8, such as an application, or from another storage node 2 that is performing a mirroring operation. The data I/O request 210 may be a request to store data into a mirrored data storage system 200,400.

At operation 620, the storage node 2 can check the I/O counter 330 associated with the entry in the gate bitmap 230 for the I/O request 210. If the I/O counter is non-zero, another I/O is already in progress within the area corresponding to the flag in the gate bitmap 230. Thus, the gate bitmap 230 entry is already flagged so the routine 600 can progress to operation 630 where the I/O request 210 can be performed. Following operation 630, the routine 600 can end.

If the I/O counter, as evaluated at operation 620 is zero, then the routine 600 can progress to operation 640 where the flag within the gate bitmap 230 is checked. If the flag within the gate bitmap is not set, then the routine 600 proceeds to operation 650 where the I/O request 210 is placed into the wait queue 310. If the flag within the gate bitmap is already set, then the routine 600 proceeds to operation 660 where the I/O request 210 is placed into the hold queue 320. The processing of the I/O from the wait queue 310 and/or the hold queue 320 is addressed in detail with respect to FIG. 7. After operation 650 or operation 660, the routine 600 can end.

Figure 7A:
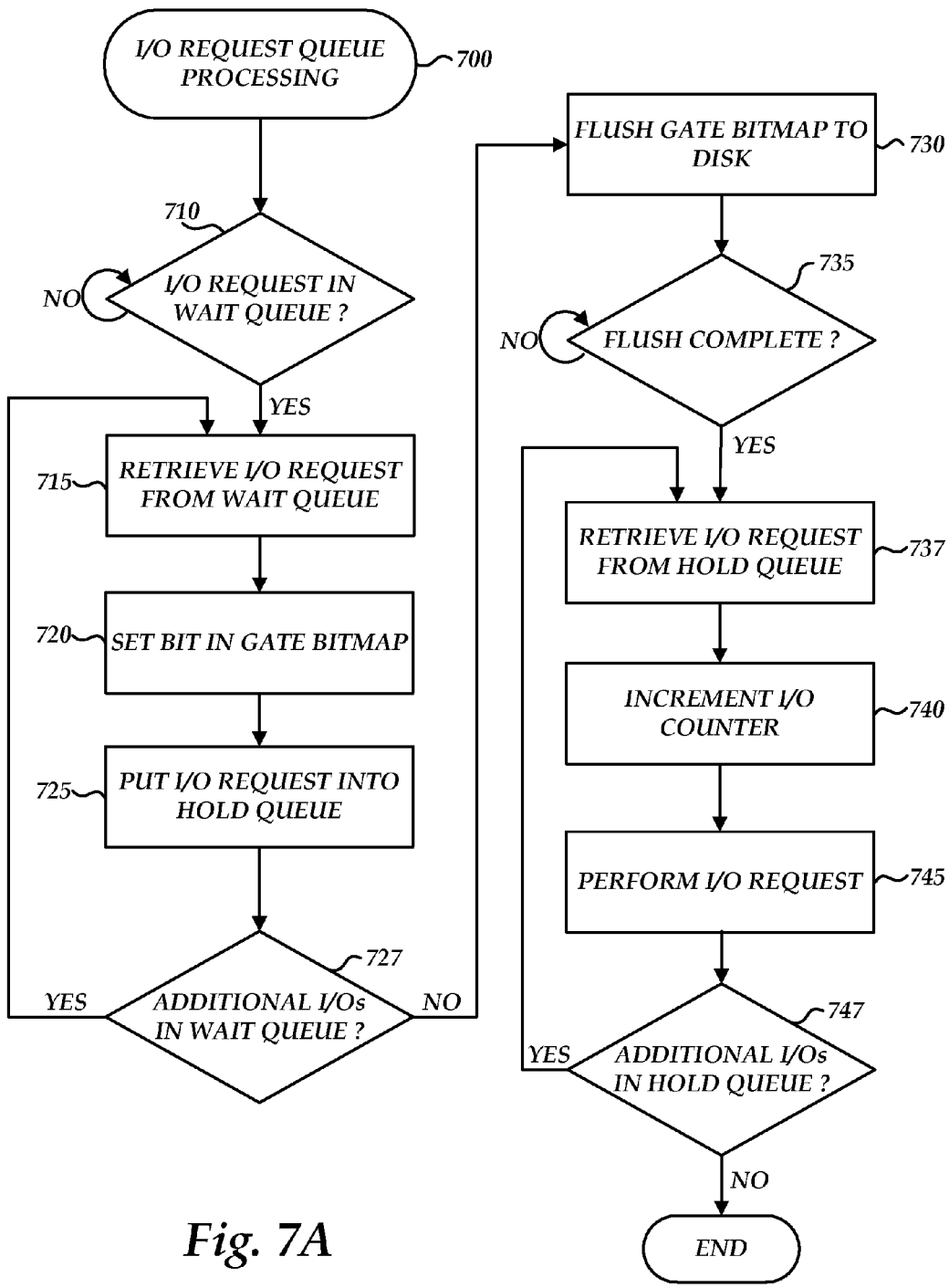
FIG. 7A is a logical flow diagram illustrating a process performed by a mirrored storage node for processing queues containing I/O requests according to one exemplary embodiment.

Turning now to FIG. 7A, additional details will be provided regarding the embodiments presented herein for I/O request queue processing. In particular, FIG. 7A is a flow diagram illustrating a routine 700 that shows aspects of an exemplary process performed by a mirrored storage node 2 for processing queues containing I/O requests.

The routine 700 can begin with operation 710 where a wait queue 310 is checked for I/O requests 210. If there are no I/O requests 210 in the wait queue 310, the routine 700 can remain at operation 710. If there are one or more I/O requests 210 in the wait queue 310, the routine 700 continues to operation 715 where an I/O request is retrieved, or popped, from the wait queue 310.

At operation 720, the bit in the gate bitmap 230 corresponding to the data I/O 210 retrieved in operation 715 can be set. Setting this bit in the gate bitmap 230 can indicate that an I/O is to occur in the storage area associated with that bit in the gate bitmap 230. At operation 725, the I/O retrieved in operation 715 is placed into the hold queue 320 to wait for the gate bitmap 230 to be persisted to disk 4.

At operation 727, the wait queue 310 is examined for additional I/O requests 210. If there are additional I/O requests 210 in the wait queue 310, the routine 700 can loop back to operation 715 to processes additional I/O requests 210 from the wait queue 310. If there are no additional I/O requests in the wait queue 310, the routine 700 can continue to operation 730.

At operation 730, the gate bitmap 230 is stored to disk 4. Storing the gate bitmap 230 to disk 4 can include updating the tailgate 350 within the gate bitmap 230 prior to writing out the gate bitmap 230 to disk 4. At operation 735, routine 700 can evaluate if the disk storage and flush of operation 730 have completed. If the store and flush are not complete, the routine 700 can wait at operation 735. The store and flush being complete can ensure that the gate bitmap 230 has been persisted to disk 4 and the routine 700 can proceed to operation 737.

At operation 737, an I/O request is retrieved, or popped, from the hold queue 320. At operation 740, the I/O counter 330 if incremented. This is the I/O counter associated with the entry in the gate bitmap 230 for the I/O request 210 that was retrieved from the hold queue 320 in operation 737. Incrementing the appropriate I/O counter 330 indicates that an I/O is beginning within the storage area associated with the entry in the gate bitmap 230.

At operation 745, the I/O request 210 is performed or executed. Performing the I/O request 210 can include reading and/or writing data 220 to, or from, the disk 4. If the I/O is a data write, then performing the I/O must also include eventually flushing the data 220 from the cache onto the physical disk 4 to ensure that the new data written is persistent.

At operation 747, the routine 700 can evaluate the hold queue 320 to determine if there are additional I/O requests 210 to process. If there are additional I/O request 210 in the hold queue 320, the routine 700 can loop back to operation 737 to processes an additional I/O requests 210 from the hold queue 320. If there are no additional I/O requests 210 in the hold queue 320, the queue processing routine 700 can end, or be held in a sleep state until addition I/O requests 210 enter one or both of the I/O queues 310, 320.

Figure 7B:
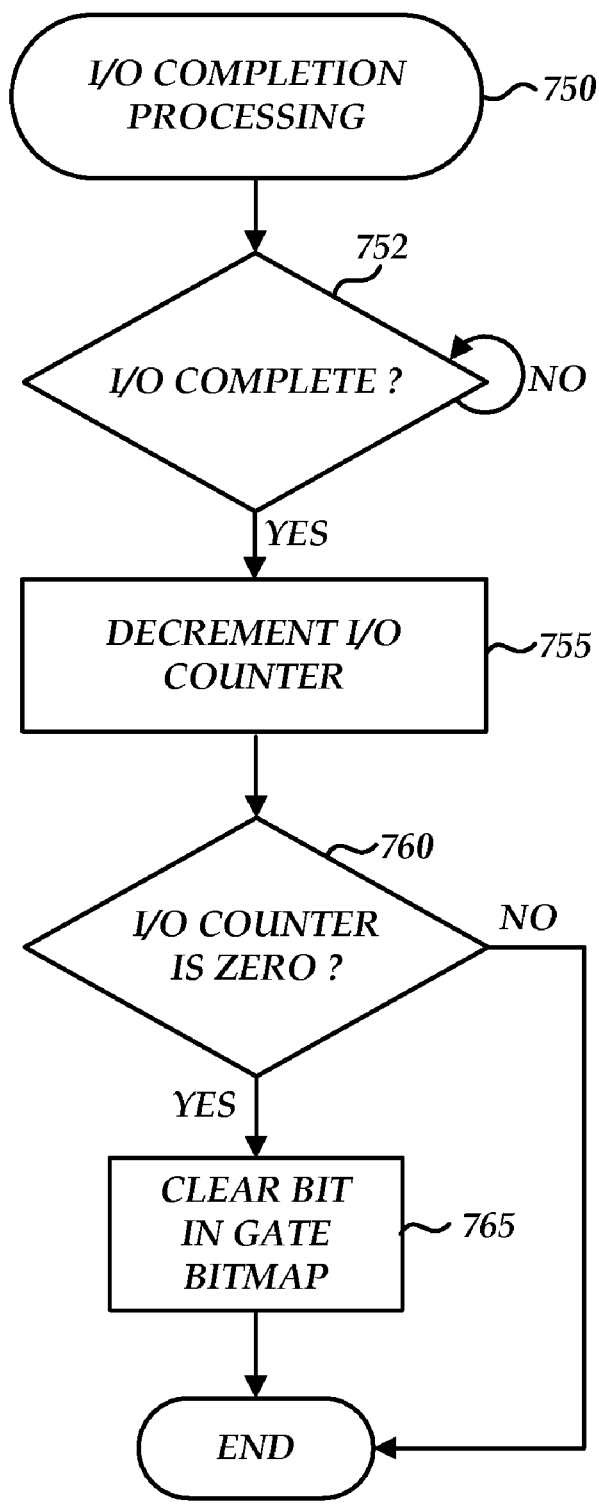
FIG. 7B is a logical flow diagram illustrating a process performed by a mirrored storage node for processing I/O request completion according to one exemplary embodiment.

Turning now to FIG. 7B, additional details will be provided regarding the embodiments presented herein for I/O completion processing. In particular, FIG. 7B is a flow diagram illustrating a routine 750 that shows aspects of an exemplary process performed by a mirrored storage node 2 for processing the completion of I/O requests.

At operation 752, the routine 750 can evaluate if a disk I/O and flush of operation 745 is complete. If the store and flush are not complete, the routine 750 can wait at operation 752. The store and flush being complete can ensure that the data 220 of the I/O request 210 has been persisted to disk 4 and the routine 750 can proceed to operation 755.

At operation 755, the I/O counter 330 associated with the entry in the gate bitmap 230 for the I/O request 210 is decremented. Decrementing the appropriate I/O counter 330 indicates that an I/O has completed in the disk 4 space represented by the entry in the gate bitmap 230.

At operation 760, the routine 750 can evaluate the I/O counter 330 that was decremented in operation 755. If the I/O counter 330 is not zero, then the routine 750 can end. If the I/O counter is zero, then all I/Os associated with the corresponding bit in the gate bitmap 230 are complete and the bit can be cleared at operation 765. After clearing the bit in the gate bitmap at operation 765, the routine 750 may end.

Figure 8:
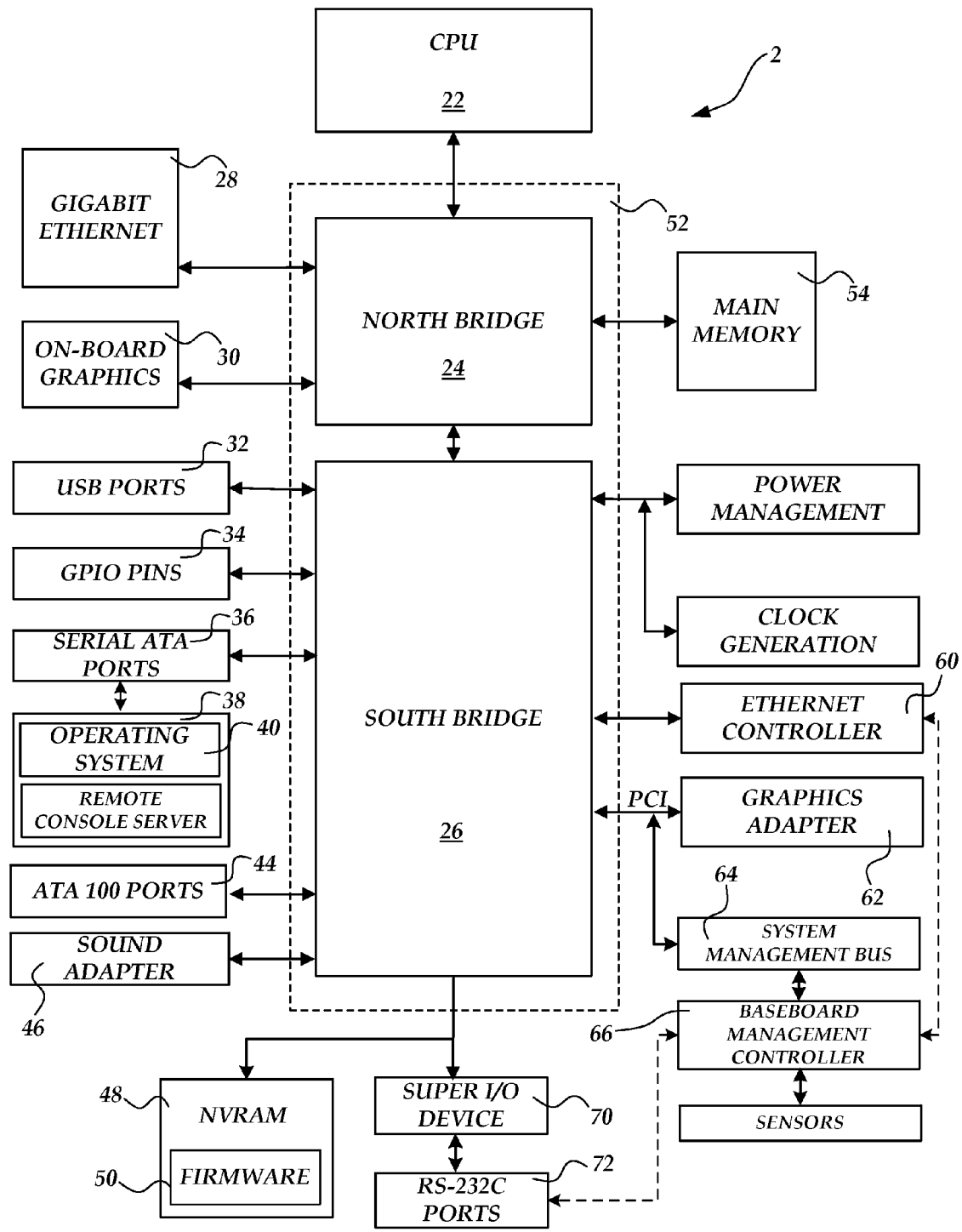
FIG. 8 is a computer architecture diagram illustrating a computer hardware architecture for a computing system capable of serving as a storage node according to one exemplary embodiment of the present invention.

FIG. 8 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 8 shows an illustrative computer architecture for a storage node computer 2 that may be utilized in the implementations described herein. The storage node computer 2 includes a baseboard, or "motherboard", which is a printed circuit board to which a multitude of components or devices may be connected by way of a system bus or other electrical communication paths. In one illustrative embodiment, a CPU 22 operates in conjunction with a chipset 52. The CPU 22 is a standard central processor that performs arithmetic and logical operations necessary for the operation of the computer. The storage node computer 2 may include a multitude of CPUs 22.

The chipset 52 includes a north bridge 24 and a south bridge 26. The north bridge 24 provides an interface between the CPU 22 and the remainder of the computer 2. The north bridge 24 also provides an interface to a random access memory ("RAM") used as the main memory 54 in the computer 2 and, possibly, to an on-board graphics adapter 30. The north bridge 24 may also include functionality for providing networking functionality through a gigabit Ethernet adapter 28. The gigabit Ethernet adapter 28 is capable of connecting the computer 2 to another computer via a network. Connections which may be made by the network adapter 28 may include LAN or WAN connections. LAN and WAN networking environments are commonplace in offices, enterprise-wide computer networks, intranets, and the internet. The north bridge 24 is connected to the south bridge 26.

The south bridge 26 is responsible for controlling many of the input/output functions of the computer 2. In particular, the south bridge 26 may provide one or more universal serial bus ("USB") ports 32, a sound adapter 46, an Ethernet controller 60, and one or more general purpose input/output ("GPIO") pins 34. The south bridge 26 may also provide a bus for interfacing peripheral card devices such as a graphics adapter 62. In one embodiment, the bus comprises a peripheral component interconnect ("PCI") bus. The south bridge 26 may also provide a system management bus 64 for use in managing the various components of the computer 2. Additional details regarding the operation of the system management bus 64 and its connected components are provided below.

The south bridge 26 is also operative to provide one or more interfaces for connecting mass storage devices to the computer 2. For instance, according to an embodiment, the south bridge 26 includes a serial advanced technology attachment ("SATA") adapter for providing one or more serial ATA ports 36 and an ATA 100 adapter for providing one or more ATA 100 ports 44. The serial ATA ports 36 and the ATA 100 ports 44 may be, in turn, connected to one or more mass storage devices storing an operating system 40 and application programs, such as the SATA disk drive 38. As known to those skilled in the art, an operating system 40 comprises a set of programs that control operations of a computer and allocation of resources. An application program is software that runs on top of the operating system software, or other runtime environment, and uses computer resources to perform application specific tasks desired by the user.

According to one embodiment of the invention, the operating system 40 comprises the LINUX operating system. According to another embodiment of the invention the operating system 40 comprises the WINDOWS SERVER operating system from MICROSOFT CORPORATION. According to another embodiment, the operating system 40 comprises the UNIX or SOLARIS operating system. It should be appreciated that other operating systems may also be utilized.

The mass storage devices connected to the south bridge 26, and their associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 6 for connecting a "Super I/O" device 70. The Super I/O device 70 is responsible for providing a number of input/output ports, including a keyboard port, a mouse port, a serial interface 72, a parallel port, and other types of input/output ports. The LPC interface may also connect a computer storage media such as a ROM or a flash memory such as a NVRAM 48 for storing the firmware 50 that includes program code containing the basic routines that help to start up the computer 2 and to transfer information between elements within the computer 2.

As described briefly above, the south bridge 26 may include a system management bus 64. The system management bus 64 may include a BMC 66. In general, the BMC 66 is a microcontroller that monitors operation of the computer system 2. In a more specific embodiment, the BMC 66 monitors health-related aspects associated with the computer system 2, such as, but not limited to, the temperature of one or more components of the computer system 2, speed of rotational components (e.g., spindle motor, CPU Fan, etc.) within the system, the voltage across or applied to one or more components within the system 2, and the available or used capacity of memory devices within the system 2. To accomplish these monitoring functions, the BMC 66 is communicatively connected to one or more components by way of the management bus 64. In an embodiment, these components include sensor devices for measuring various operating and performance-related parameters within the computer system 2. The sensor devices may be either hardware or software based components configured or programmed to measure or detect one or more of the various operating and performance-related parameters. The BMC 66 functions as the master on the management bus 64 in most circumstances, but may also function as either a master or a slave in other circumstances. Each of the various components communicatively connected to the BMC 66 by way of the management bus 64 is addressed using a slave address. The management bus 64 is used by the BMC 66 to request and/or receive various operating and performance-related parameters from one or more components, which are also communicatively connected to the management bus 64.

It should be appreciated that the computer 2 may comprise other types of computing devices, including hand-held computers, embedded computer systems, personal digital assistants, and other types of computing devices known to those skilled in the art. It is also contemplated that the computer 2 may not include all of the components shown in FIG. 8, may include other components that are not explicitly shown in FIG. 8, or may utilize an architecture completely different than that shown in FIG. 8.

Based on the foregoing, it should be appreciated that technologies for mirrored disk data consistency using write-intent gating are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for maintaining mirrored data consistency between a primary networked storage node and a secondary networked storage node using write-intent logging, the method comprising:
   receiving an input/output (I/O) request at the primary networked storage node, wherein receiving the I/O request at the primary networked storage node comprises:
      checking a counter associated with an area of the disk targeted by the I/O request;
      checking the log entry associated with the area;
      placing the I/O request into a wait queue if the counter is zero and the log entry is not set;
      placing the I/O request into a hold queue if the counter is zero and the log entry is set; and
      processing the wait queue and the hold queue;
   logging the I/O request to a log at the primary networked storage node;
   storing the log to a disk associated with the primary networked storage node;
   executing the I/O request at the primary networked storage node;
   relaying the I/O request to the secondary networked storage node for execution;
   waiting for completion of both executing the I/O request at the primary networked storage node, and execution of the I/O request to the secondary networked storage node;
   clearing the log after waiting; and
   acknowledging completion of the I/O request after clearing the log.

2. The method of claim 1, wherein the log comprises a gate bitmap, bits of the gate bitmap corresponding to respective storage areas of the disk.

3. The method of claim 1, wherein processing the wait queue and the hold queue comprises:
   retrieving the I/O request from the wait queue;
   setting the log entry associated with an area of the disk targeted by the I/O request retrieved from the wait queue;

placing the I/O request retrieved from the wait queue into the hold queue after setting the log entry;
incrementing the counter prior to executing the I/O request at the primary networked storage node; and
decrementing the counter after completion of executing the I/O request at the primary networked storage node.

4. The method of claim 1, wherein processing the wait queue and the hold queue comprises retrieving the I/O request from the hold queue prior to executing the I/O request at the primary networked storage node.

* * * * *